No. 710,887. Patented Oct. 7, 1902.
F. B. POPE.
APPARATUS FOR REDUCING SEED HULLS.
(Application filed Apr. 23, 1901.)
(No Model.) 3 Sheets—Sheet 2.
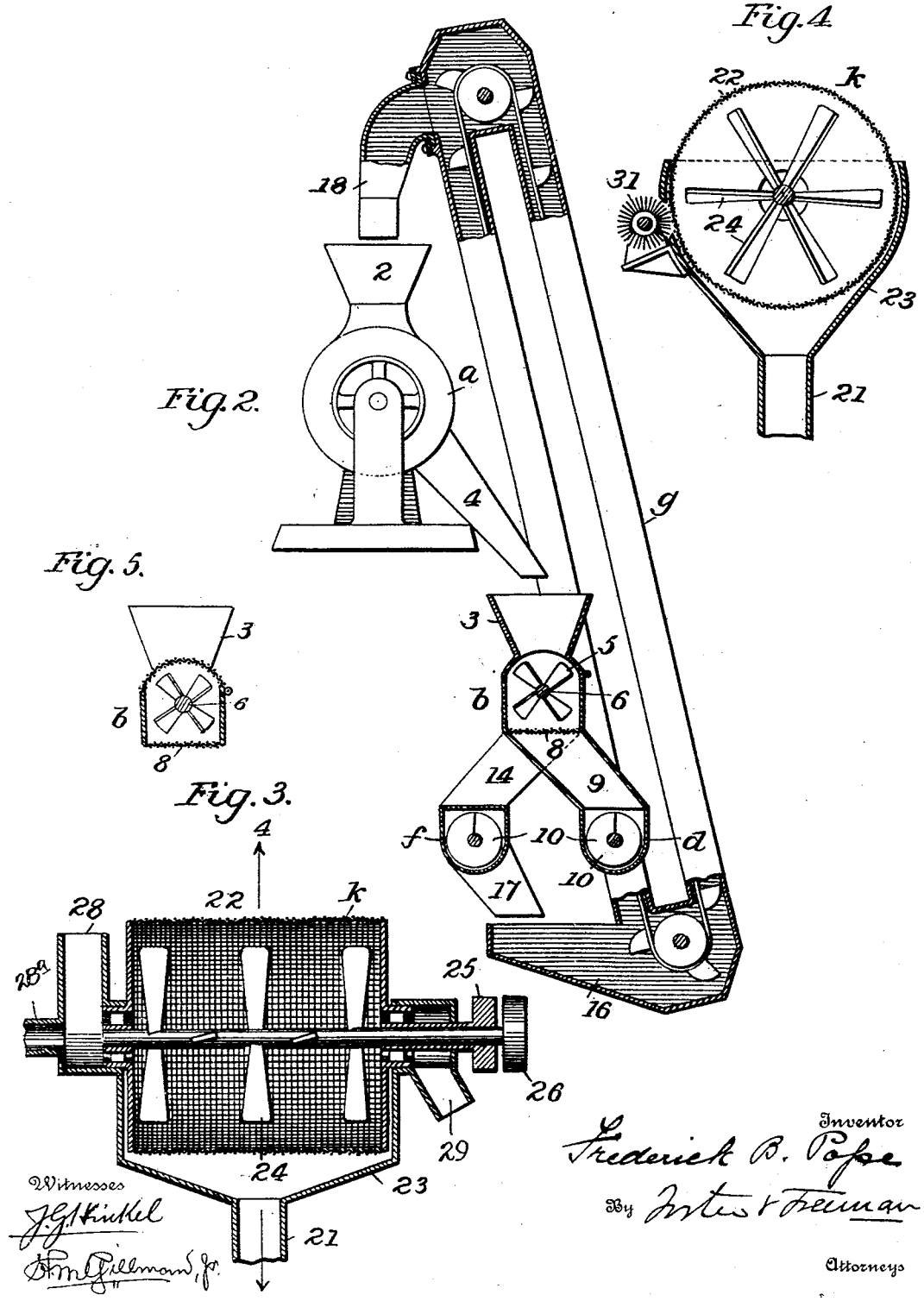

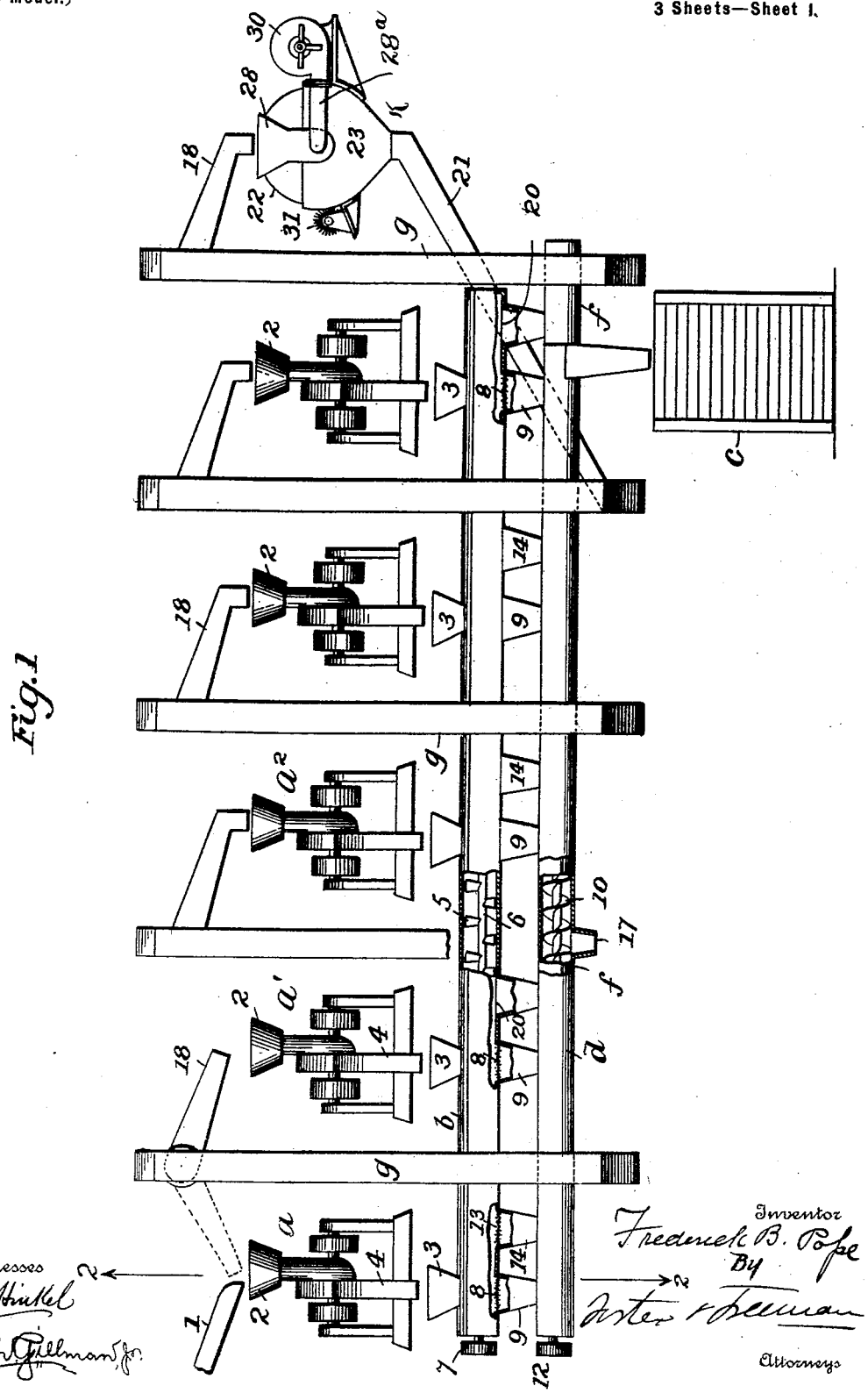

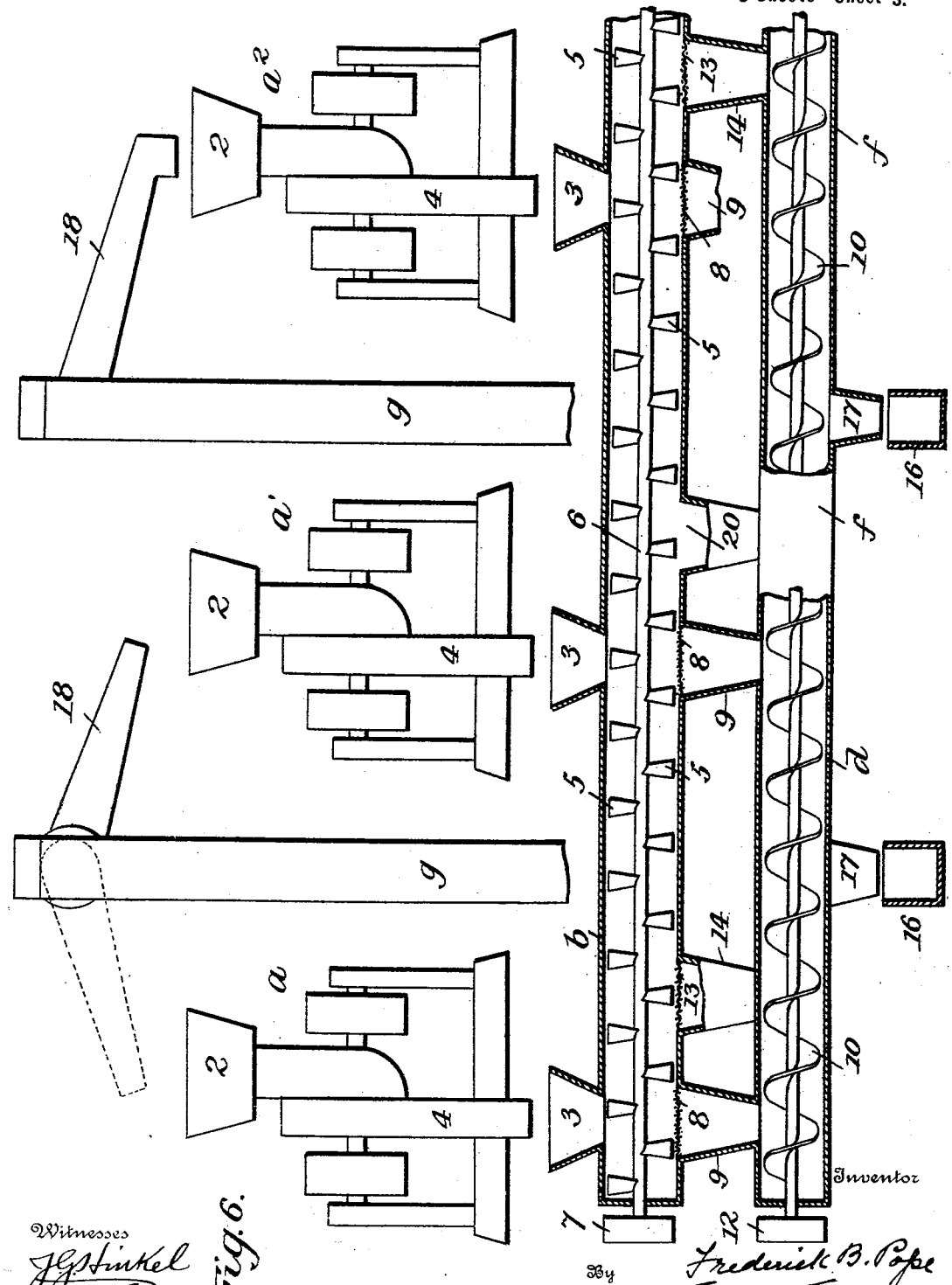

UNITED STATES PATENT OFFICE.

FREDERICK B. POPE, OF AUGUSTA, GEORGIA.

APPARATUS FOR REDUCING SEED-HULLS.

SPECIFICATION forming part of Letters Patent No. 710,887, dated October 7, 1902.

Application filed April 23, 1901. Serial No. 57,134. (No model.)

*To all whom it may concern:*

Be it known that I, FREDERICK B. POPE, a citizen of the United States, residing at Augusta, in the county of Richmond and State of Georgia, have invented certain new and useful Improvements in Apparatus for Reducing Seed-Hulls, of which the following is a specification.

My invention has for its object to reduce to a meal the hull portions of seeds and in the case of cotton or other like seeds to separate therefrom the fibrous portions; and to this end my invention consists of an apparatus whereby the material is operated upon and the reduced portion in the form of a meal separated and the other portions subjected to repeated action until all parts of the hull are reduced to a meal and the fibers are removed, as fully set forth hereinafter and as illustrated in the accompanying drawings, in which—

Figure 1 is an elevation of an apparatus illustrating one arrangement embodying my improvement; Fig. 2, an enlarged cross-sectional elevation on the line 2 2, Fig. 1; Fig. 3, a longitudinal section of one form of separator which may be employed; Fig. 4, a section on the line 4 4, Fig. 3; Fig. 5, a section of the receiver provided with a screen-top. Fig. 6 is an elevation, on enlarged scale and partly in section and partly broken away, of a portion of the apparatus.

In the improved apparatus I make use of a plurality of disintegrating or grinding apparatus which may be of any suitable character, but which are preferably in the form of attrition-mills $a$ $a'$ $a^2$, &c., which may be of any desired number, five being shown. These apparatus, hereinafter termed "mills," may be arranged one above the other or in any suitable relation, but in my improved apparatus are most advantageously employed when arranged side by side, as shown. With the first mill of the series is combined a chute or other delivering apparatus 1, by means of which there is delivered to the hopper 2 of this mill the material to be ground—that is, the hulls of cotton-seed separated from the kernels, but having connected therewith the fibers, which it is one of the purposes of the apparatus to separate. Past all of the mills extend what I term a "receiver" $b$, the same being a long tube or trough provided opposite each mill with a hopper 3, to which the material discharged from the mill is conducted by a chute 4 or otherwise. The receiver $b$ therefore receives all of the material discharged from all of the mills, and the said material is agitated very rapidly in the receiver by means of any suitable beater or agitator—as, for instance, by radial blades 5 on a shaft 6, extending longitudinally through the receiver and provided with a pulley 7 at the outer end to receive the belt by which the shaft is driven. The blades 5 are set at an angle, so as not only to agitate the material, but also carry it longitudinally along the receiver. At different points along the receiver $b$ the latter is perforated or provided with openings, across which screens or sieves are extended, preferably one opposite each mill, and these screens 8 are of such a character as to permit the passage through them of the finely-ground hull-meal only, preventing the passage of larger shells or fibers, so that the material which passes through the screens 8 consists only of the finished ground hull product. The finished product passing from all of the screens 8 may be conducted to a bin or receptacle $c$ in any suitable manner; but preferably I make use of a conduit $d$ in the form of a trough or tube extending past all of the screens 8, from which the material is conducted to the conduit by chutes 9, and the meal is fed along the conduit by means of a rotary conveyer 10, the shaft of which carries a drive-pulley 12. After separating the finished meal product that passes through any part of the receiver $b$ the remaining mixture of hulls and fiber has a certain proportion of loose hulls and loose fiber and a certain proportion of hulls and adhering fiber, and it is necessary to further grind the hulls and to separate the hulls and fiber when together. The whole mass might be conducted in succession through the different mills and ground together after each sifting out of the meal; but this would necessitate the employment of a series of very heavy mills, and I avoid this necessity by separating from the mass the hulls which are disassociated from the fiber and conducting these hulls to lighter or smaller mills which will operate upon them effectively, while the combined hulls and fiber are carried to larger mills, as required for operating on this material. Different arrangements of screens and conveyers may be employed in connection with the mills to secure this result; but, as shown, I make use of a second conduit $f$ and of a second series of screens 13 in the receiver $b$, which screens are of a character to permit the passage of the broken hulls only, chutes 14 conducting these hulls to the conduit $f$, from which suitable conveyers carry the hulls to the mills that are to operate upon the same. Any suitable conveyers $g$ may be employed; but in the construction shown there are grain-elevators the receiving-troughs 16 of which extend below the delivery-chutes 17 of the conduit $f$, while the delivery-chutes 18 are arranged to conduct the material to the hopper of the mill which is to operate upon the same. Preferably the chutes 18 may be adjusted to different positions, so that the material may be delivered to the mill following that which first operated upon the same or may be swung over to carry it back to the first mill for repeated operation.

A screen 13 is arranged in the receiver $b$ in a position in advance of each conductor that is to deliver the hulls to one of the mills; but where the entire material is to pass through the mill the receiver is provided with an opening communicating with a chute 20, which conducts said material to the conduit $f$, from which the mass of hulls and fiber passes through the adjacent conductor to the mill which is to operate upon the same.

A sufficient number of mills is employed, or the material is passed so repeatedly through a smaller number of mills that after the final operation the greater proportion of the hulls will have been reduced to a meal and separated and discharged into the bin $c$, leaving only the fiber with a certain amount of adhering hull particles. This fiber is conducted to the terminal elevator $g$, which raises it to a separator $k$ of suitable character, where it is so operated upon that the remaining particles of hull or the greater proportion thereof will be detached, and these particles are conducted by a chute 21 back to one of the elevators, by means of which they are delivered to one of the mills for regrinding the mixture with the other material.

Any suitable form of separator may be employed, that shown consisting of a perforated cylinder 22, the lower part of which is inclosed by a casing 23, communicating with the chute 21, the casing having hollow trunnions through which passes a shaft carrying beating-blades 24, one of said hollow trunnions carrying a pulley 25 adjacent to a pulley 26, carried by the shaft, so that by means of suitable belts the cylinder may be turned in one direction and the beater-shaft in an opposite direction.

The cylinder has a neck at each end, one neck communicating with the receiving-hopper 28 and the other with a discharge-chute 29. From the lower end of the hopper 28 a pipe $28^a$ leads to a blast-fan 30, which latter forces a current of air through the pipe $28^a$, which drives the fiber and adhering hull fragments through the neck into the separator, where it will be violently beaten by the blades 24 with the result that the fragments of hull will be separated from the fiber. The fiber being lighter than the hull will be blown through the other neck to the discharge-chute 29, while the particles of heavier meal descend and pass through the perforations of the casing to the chute 21. In order to maintain the perforations of the cylinder open, I make use of a brush 31 upon a shaft parallel to the casing and rotating in contact therewith.

In addition to the screens before specified the receiver $b$ may have a screen-top, preferably curved and hinged, so as to be swung to one side, as shown in Fig. 5. The material in the receiver will be thrown out by the action of the beaters and the finer fibers will adhere to this upper screen, from which it may be brushed by hand or otherwise, thus reducing the work in the separators as well as securing in a separate condition the finer fibers for paper-stock, the coarser fibers which are conducted to the screen constituting a second grade.

I have not shown in the drawings the details of the attrition-mills or the supports therefor, nor other details of construction having no necessary relation to my invention, as these features may be of any suitable character and will be evident to any one skilled in the art.

Without limiting myself to the precise construction and arrangement of parts shown, I claim as my invention—

1. In an apparatus for reducing the hulls of cotton-seed and separating the fiber therefrom, the combination of a series of mills, a receiver common to all the mills, a series of separated fine-mesh sieves in the bottom of the receiver, a series of separated coarser-mesh sieves also in the bottom of the receiver and alternating with the fine-mesh sieves, a rotary beater for agitating the material delivered from the mills to the receiver and for moving it over the sieves whereby the hull-meal is sifted through the fine-meshed sieves and free coarser fragments of hull are sifted through the coarser-mesh sieves, means for conveying the free fragments of hulls back to one of the mills, and means for conveying the fiber and adhering hull to a separating device, substantially as set forth.

2. In an apparatus for reducing the hulls of cotton-seed and separating the fiber therefrom, the combination with a series of mills for reducing the hulls, of a receiver common to all the mills and having a movable perforated top, sieves in the bottom of the receiver, and beater-blades carried by a rotary shaft within the receiver for agitating the material delivered from the mills to the receiver and moving it through the receiver, whereby hull-meal and free fragments of hull are sifted through the sieves and the free fiber is collected by the perforated top, substantially as set forth.

3. In an apparatus for reducing the hulls of cotton-seed and separating the fiber therefrom, the combination with a series of mills, a receiver to which the ground product from the mills is delivered, means for collecting the free fiber from the ground product within the receiver, means for separating the hull-meal from the ground product within the receiver, and a receptacle for fiber and adhering hull tailed off from the receiver, of a separator to which such tailings are conveyed, said separator comprising a rotary screen, a rotary beater within the screen, means to create a current through the screen to carry out the fiber, and a receptacle for the hull fragments which pass through the meshes of the screen, substantially as set forth.

4. In an apparatus for reducing the hulls of cotton-seed and separating the fiber therefrom, the combination with a series of mills, a receiver to which the ground product from the mills is delivered, means for separating and collecting the free fiber from the ground product within the receiver, means for separating the hull-meal from the ground product within the receiver, and a receptacle for fiber and hull fragments adhering thereto tailed off from the receiver, of a separator to which such tailings are conveyed, said separator comprising a rotary screen, a rotary beater within the screen, means to create a current through the screen to carry out the fiber, a rotary brush engaging the exterior of the screen, and a receptacle for the hull fragments which pass through the meshes of the screen, substantially as set forth.

In testimony whereof I have signed my name to this specification in the presence of two subscribing witnesses.

FREDERICK B. POPE.

Witnesses:
  H. M. GILLMAN, Jr.,
  J. J. MCCARTHY.